US 10,084,697 B2

(12) United States Patent
Judge et al.

(10) Patent No.: US 10,084,697 B2
(45) Date of Patent: *Sep. 25, 2018

(54) METHODS AND APPARATUS FOR INTERNET-SCALE ROUTING USING SMALL-SCALE BORDER ROUTERS

(71) Applicant: Amazon Technologies, Inc., Seattle, WA (US)

(72) Inventors: Alan Michael Judge, Dublin (IE); David J. O'Meara, Dublin (IE); Daniel T. Cohn, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,320

(22) Filed: Nov. 14, 2016

(65) Prior Publication Data
US 2017/0063677 A1    Mar. 2, 2017

Related U.S. Application Data

(63) Continuation of application No. 14/106,509, filed on Dec. 13, 2013, now Pat. No. 9,457,115, which is a (Continued)

(51) Int. Cl.
*H04L 12/46* (2006.01)
*H04L 12/741* (2013.01)
(Continued)

(52) U.S. Cl.
CPC .......... *H04L 45/54* (2013.01); *H04L 12/4633* (2013.01); *H04L 41/12* (2013.01); *H04L 45/58* (2013.01); *H04L 69/16* (2013.01)

(58) Field of Classification Search
CPC ..... H04L 45/54; H04L 45/58; H04L 12/4633; H04L 41/12
See application file for complete search history.

(56) References Cited

U.S. PATENT DOCUMENTS 7,076,559 B1 * 7/2006 Ghanwani .............. H04L 45/04
370/352
8,331,371 B2  12/2012 Judge et al.
(Continued)

OTHER PUBLICATIONS

TechRepublic: A ZDNet Tech Community (web page) PathControl improves Internet routing and VPN performance by Ray Geroski, Sep. 12, 2002, pp. 1-4.
(Continued)

*Primary Examiner* — Ian N Moore
*Assistant Examiner* — Ronald h Davis
(74) *Attorney, Agent, or Firm* — Robert C. Kowert; Meyertons Hood Kivlin Kowert & Goetzel, P.C.

(57) ABSTRACT

Methods and apparatus for Internet-scale routing using small-scale border routers and IP tunneling are described. Each border router is directly connected to a transit provider. Routing protocol peerings may be passed via the border routers through tunnels to a routing service; the routing service and the transit provider router(s) appear to be directly adjacent routing peers. The routing service receives routing data from the transit provider(s), maintains the routing data in a routing table, and processes the routing data in the routing table to select best paths. A mapping service may be informed, by the routing service, of a best exit point (or points) for each Internet prefix of each packet to be routed on the Internet. Outbound packets from devices on the network to the Internet, and inbound packets from the Internet to the network devices, may be encapsulated and passed through tunnels as directed by the mapping service.

20 Claims, 10 Drawing Sheets

Related U.S. Application Data continuation of application No. 12/825,212, filed on Jun. 28, 2010, now Pat. No. 8,611,349.

(51) Int. Cl.
*H04L 12/775* (2013.01)
*H04L 12/24* (2006.01)
*H04L 29/06* (2006.01)

(56) References Cited

U.S. PATENT DOCUMENTS

| | | | |
|---|---|---|---|
| 8,611,349 B1 | 12/2013 | Judge et al. | |
| 8,611,359 B1 | 12/2013 | Kompella et al. | |
| 9,497,115 B1 | 11/2016 | Judge et al. | |
| 2002/0165980 A1 | 11/2002 | Brown | |
| 2004/0039840 A1* | 2/2004 | Dispensa | H04L 45/02 709/242 |
| 2005/0047413 A1 | 3/2005 | Ilnicki et al. | |
| 2005/0232285 A1 | 10/2005 | Terrell et al. | |
| 2006/0259818 A1 | 11/2006 | Howell et al. | |
| 2006/0274718 A1 | 12/2006 | Butenweg et al. | |
| 2008/0285541 A1 | 11/2008 | Van Der Merwe et al. | |
| 2009/0248846 A1 | 10/2009 | Cohn | |
| 2009/0257439 A1 | 10/2009 | Xu | |
| 2010/0057933 A1 | 3/2010 | Allen et al. | |
| 2010/0080234 A1* | 4/2010 | Borkenhagen | H04L 45/02 370/395.31 |
| 2010/0220736 A1 | 9/2010 | Mohapatra et al. | |
| 2011/0225207 A1 | 9/2011 | Subramanian et al. | |
| 2012/0102228 A1 | 4/2012 | Cugini et al. | |

OTHER PUBLICATIONS

C. Perkins, "IP Encapsulation within IP", RFC 2003, Network Working Group, Oct. 1996, pp. 1-10.
U.S. Appl. No. 12/825,212, filed Jun. 28, 2010, Alan M. Judge.
U.S. Appl. No. 14/106,509, filed Nov. 15, 2016, Alan M. Judge et al.

* cited by examiner

METHODS AND APPARATUS FOR INTERNET-SCALE ROUTING USING SMALL-SCALE BORDER ROUTERS

This application is a continuation of U.S. application Ser. No. 14/106,509, filed Dec. 13, 2013, now U.S. Pat. No. 9,457,115, which is a continuation of U.S. application Ser. No. 12/825,212, filed Jun. 28, 2010, now U.S. Pat. No. 8,611,349, which are hereby incorporated by reference in their entirety.

BACKGROUND

Network/Internet Routing

The Internet, sometimes called simply "the Net," is a worldwide system of computer networks in which any one computer on a network may, with proper permission, obtain information from, or send information to, any other computer on any other network on the Internet. Routing may be defined as the process of selecting paths, or routes, on a network along which to send network traffic. In computer networks, including the Internet, routing technologies direct the transit of data from a source to a destination through various intermediate devices (which may be collectively referred to as routers). A key routing technology for the Internet is the routing protocol. Currently, the routing protocol used on the Internet is Border Gateway Protocol (BGP), defined originally in Network Working Group Request for Comments (RFC) 1771 and updated in RFC 4271. RFC 4271 defines BGP as an inter-Autonomous System (AS) routing protocol. BGP-enabled systems or devices on a network exchange network reachability (routing) information with other BGP systems or devices on the network. When a BGP-enabled system establishes a BGP connection to another system on a network, the systems interchange BGP messages to update Internet routing information on the systems. The collection of routing information on a BGP system is generally referred to as a routing table. BGP may be used for routing data internally on networks and for routing data external to networks (e.g., from one network to another on the global Internet). BGP used internally on networks may be referred to as internal BGP (iBGP); external (Internet) BGP may be referred to as eBGP.

On the global Internet, connectivity between networks may be provided by transit providers. (However, networks may also establish peer connections). Transit providers may be defined as generally large networks expressly for the purpose of providing connectivity for the Internet. A transit provider network is sometimes referred to as a "backbone." Transit providers may be, but are not necessarily, commercial enterprises that charge for routing packets via their network infrastructure. Transit providers may provide local, regional, or international/global routing on the Internet. Examples of transit providers include, but are not limited to, Verizon® and Level 3® Communications.

Generally, to use a transit provider, a network must have at least one physical connection, e.g. a fiber optic or cable connection, to at least one transit provider edge or border router, via which routing protocol information, and data packets, may be exchanged. While a network may connect to a single transit provider to establish a presence on the Internet via the transit provider, many networks, especially larger networks (e.g., carriers, content delivery networks (CDNs), and large enterprises), may establish and maintain such connections to multiple transit providers. FIG. 1A illustrates several networks 120A through 120F each physically connected to two transit providers 110A and 110B. The device(s) on a network 120 that are physically connected to transit provider border routers may generally be referred to as border routers. Networks 120 may include a range of networks from small networks, such as local networks for small businesses, schools, government entities, or other relatively small public or private enterprises, to large networks, such as networks for large businesses, schools, government entities, or other relatively large public or private enterprises. Networks 120 may also include local or regional Internet Service Providers (ISP) that provides Internet connectivity to residential customers, small entities, etc. Networks 120 may also include the networks of commercial Web enterprises or e-businesses that, for example, provide electronic retail sales or web services to customers via the Internet. A network 120 may include two or more subnetworks, data centers, smaller local networks, or other network components that are interconnected to form a larger network 120.

FIG. 1B illustrates example routes between two networks provided by two transit providers. Border routers of networks 120A and 120B are physically connected to border routers of transit providers 110A and 110B. Each transit provider 110 may provide one or more paths or routes between networks 120A and 120B via which packets may be sent. Each route passes through one or more nodes of the respective transit provider 110. A node may be a switch, router, computer system, or any other networking component. A path may pass through one or more external nodes as shown on route 110A1. An external node may, for example, be a border router of another network. Each route may include one or more "hops," the connection between two nodes via which packets are exchanged. As shown in FIG. 1B, some routes may have fewer hops than other routes. For example, route 110A3 includes two hops (ignoring the physical connections between the border routers), while route 110B2 includes four hops. Each transit provider 110 provides routing information to each connected network 120 via routing protocol (e.g., BGP) sessions established between the border routers. This routing information includes descriptions of the routes provided by the respective transit provider 110 between the networks 120A and 120B, as well as the descriptions of routes to other networks 120.

Conventionally, the border router and transit provider router establish a routing protocol (e.g., BGP) connection over the physical connection, and the transit provider router provides the border router with routing information available through the transit provider. The border router collects and stores this routing information (and routing information from other transit providers, if any, that the border router is connected to) as a routing table. The routing table for the global Internet may be referred to as the global Internet routing table. The network border router may perform other functions on the routing information, for example assuring that there are no "loop" routes in the routing table by excluding routes that include the network's border router.

The global Internet routing table is large, currently including over 300,000 routes, and is growing steadily. Many networks, for example carriers, content delivery networks (CDNs), and large enterprise networks, may need to route their external traffic based on the entire Internet routing table. Larger networks are generally connected to two or more transit providers and peers, and must choose appropriate routes to different parts of the Internet. Most other types of routing (enterprise and much of what happens internally within data centers or networks) may require much smaller routing tables (1000s of routes); Internetbound traffic is handed off to transit providers for routing. Generally, high speed routing (10 gb and up) is hardware accelerated: custom ASICs (Application-Specific Integrated Circuits) perform the bulk of the work, with traditional CPUs (Central Processing Units) performing control-plane functions. A key feature of these ASICs is the size of the forwarding table or Forwarding Information Base (FIB) that they support. Larger FIBs substantially increase the cost and complexity of the ASICs.

A result of the above is that the route table capacity of networking devices has become bi-modal in distribution between Internet-scale routers and commodity routers. Internet-scale routers (referred to herein as large-scale routers) may support one million or more routes. These large-scale routers are manufactured by a relatively small number of companies (e.g., Cisco® Systems, Inc. and Juniper® Networks, Inc.), tend to be expensive (e.g., $300,000-$1,000,000), and sell in relatively small volumes. In addition, these systems are generally proprietary systems that typically do not support customization or user extension. Commodity routers (referred to herein as small-scale routers) support a much smaller number of routes (e.g., 16K-32K routes), and high market volume tends to keep prices relatively low (e.g., $15,000 and under). Most networks use these small-scale routers for internal network routing (e.g., using Open Shortest Path First (OSPF)), although some very large networks may use large-scale routers for at least some internal networking.

FIG. 1C illustrates a network connected to the Internet via physical connections between transit providers and large-scale border router(s), according to the prior art. Network 120A may include multiple computing and peripheral devices 150 such as servers, workstations, printers, storage systems, etc., which may be referred to as endpoint devices, as well as multiple internal networking devices 140 such as internal (generally small-scale) routers, switches, bridges, etc. Network 120A may need to route inbound and outbound external traffic to other networks or devices on the Internet based on the entire Internet routing table 132. Conventionally, because of the large number of routes in the global Internet routing table (300,000+), network 120 will include one or more large-scale border routers 130 that are each physically connected to one or more transit provider 110 border routers, that each establish BGP sessions with connected transit providers 110, and that are each configured to store the full Internet routing table 132.

Figure 1A:
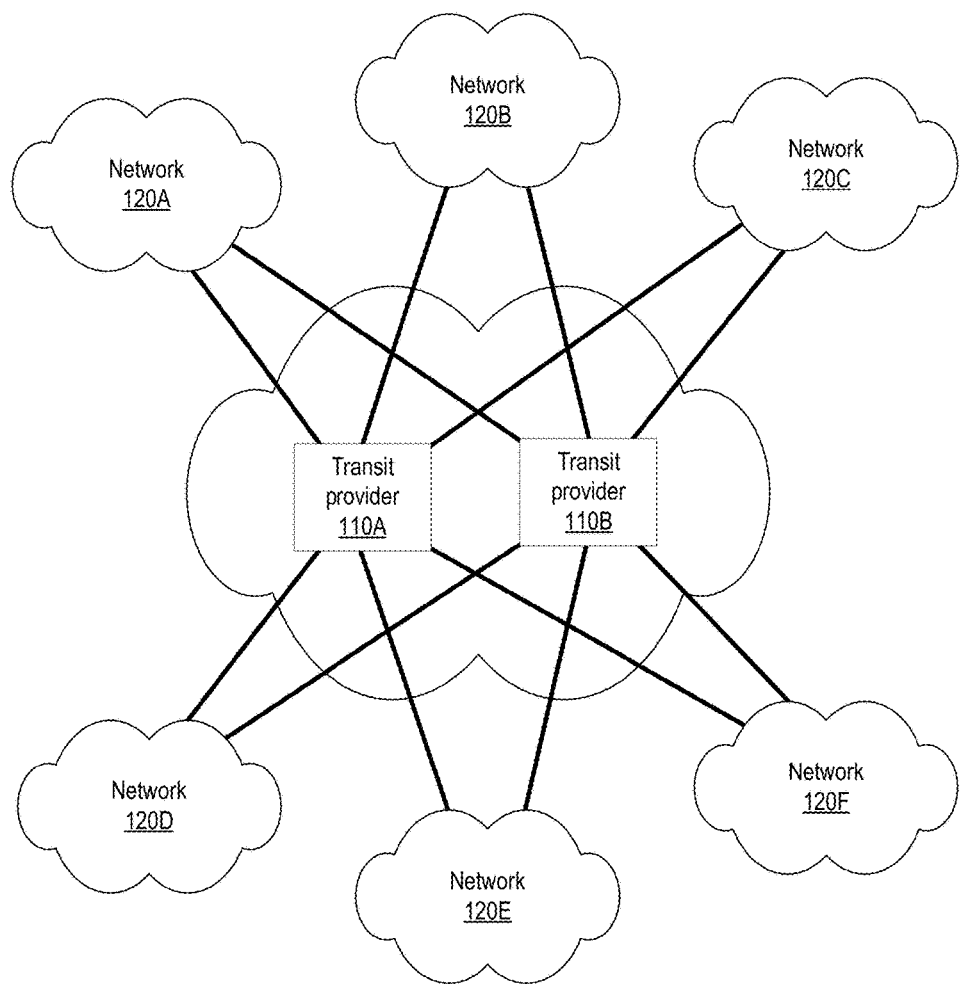
FIG. 1A illustrates an example of networks each connected to two transit providers.
Figure 1B:
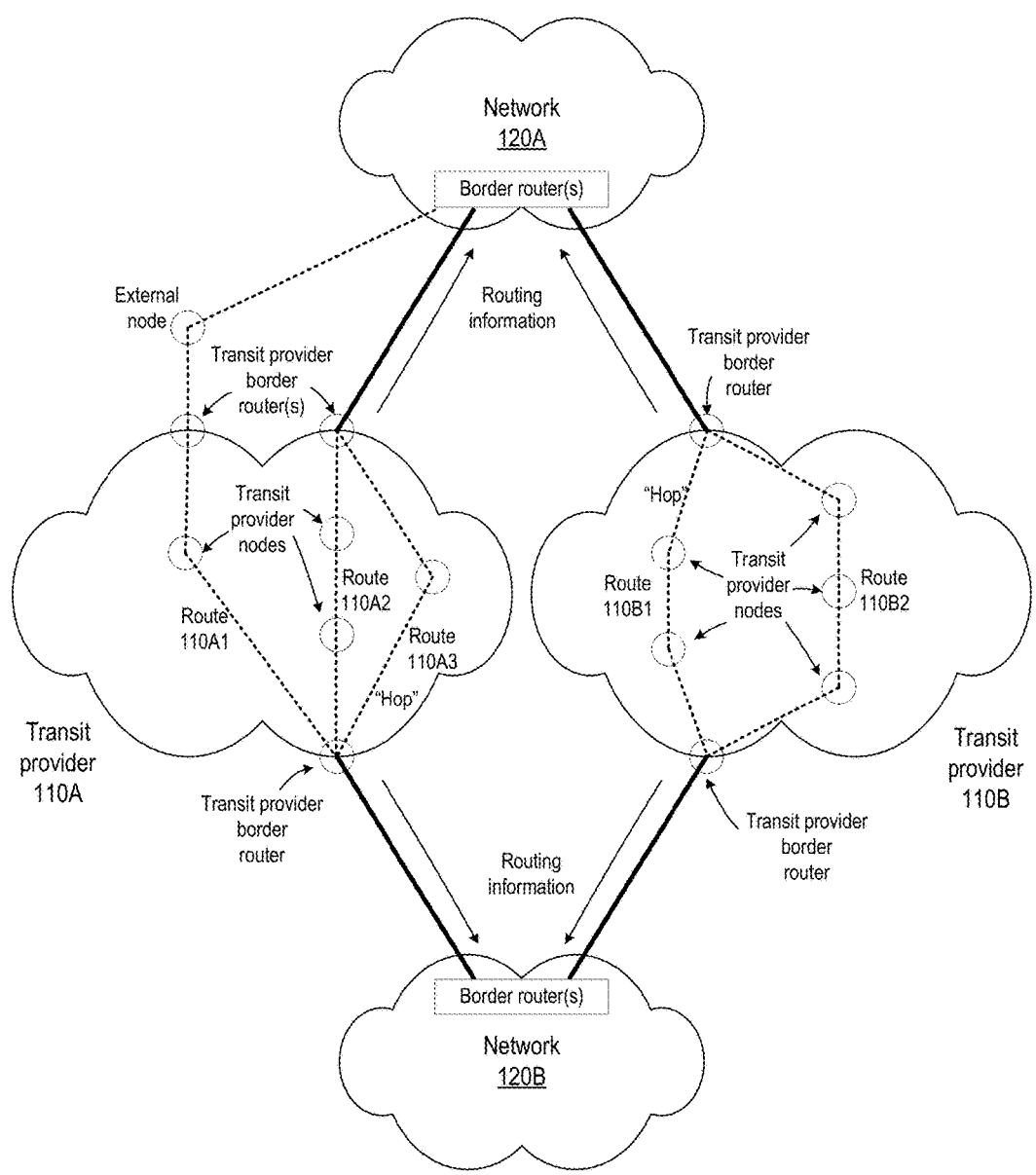
FIG. 1B illustrates an example of routes between two networks provided by two transit providers.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for achieving Internet-scale routing using small route table commodity devices (i.e., small-scale routers) and Internet Protocol (IP) tunneling are described. Conventionally, because of the large number of routes in the global Internet routing table, a network wishing to perform Internet-scale routing would include one or more large-scale border routers each physically connected to one or more transit providers and each capable of storing the entire global Internet routing table. Embodiments may provide a combined hardware and software solution that enables the configuration of very high capacity networks with full Internet access using small-scale, commodity routers that are not capable of storing the entire Internet routing table as border routers, rather than large-scale routers as is conventionally required to support full Internet access using the entire Internet routing table. In addition to the small-scale routers used as border routers, at least some embodiments may employ an Internet Protocol (IP) tunneling technology to provide the overlay network, a routing service technology, and a mapping service technology. Each of these technologies is further described below in reference to FIG. 2.

Using these technologies and small-scale routers as border routers, embodiments enable the routing of traffic to and from the Internet without a large-scale router in the traffic path that is capable of holding the entire Internet routing table. This allows a network to be configured to support Internet-scale routing at less cost than conventional systems employing large-scale routers as border routers. The use of small-scale routers as border routers may also add flexibility to routing, as a network employing small-scale border routers, routing service technology, and mapping service technology may be more easily configurable to support the application of other parameters, such as business logic and network weather parameters, in routing decisions than are conventional networks employing large-scale routers as border routers.

Figure 1C:
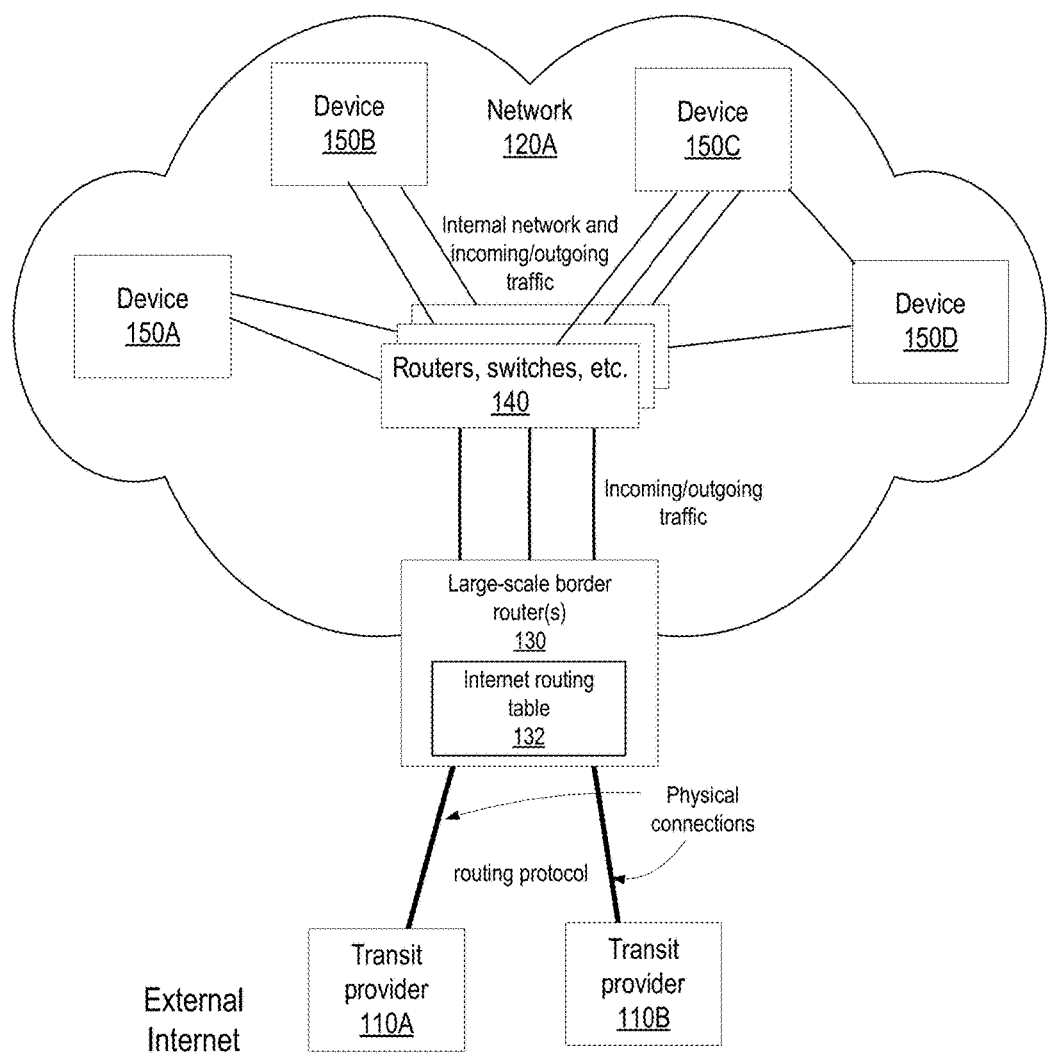
FIG. 1C illustrates an example network connected to the Internet via physical connections between transit providers and large-scale border router(s).
Figure 2:
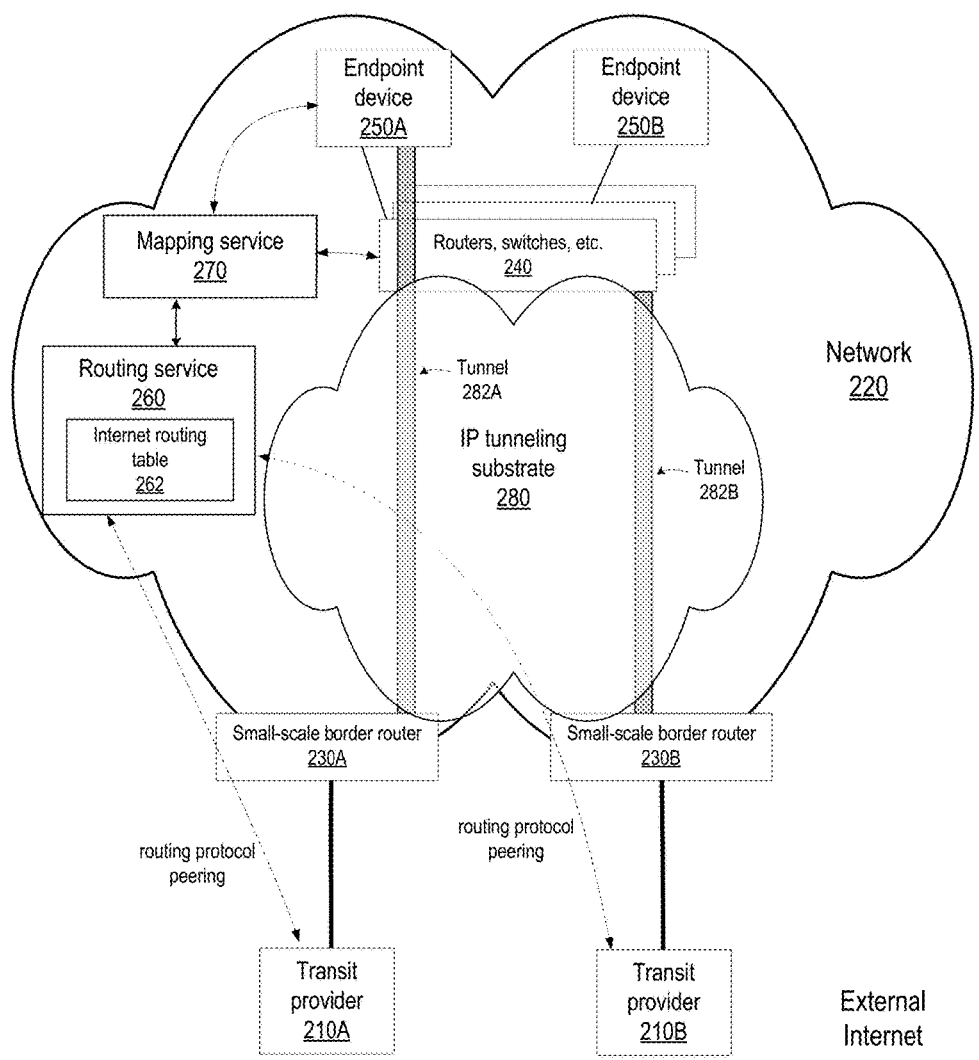
FIG. 2 illustrates an example network with full Internet access using small-scale, commodity routers, according to at least some embodiments.

FIG. 2 illustrates an example network with full Internet access using small-scale commodity routers, according to at least some embodiments. Internet transit providers 210 use a routing protocol (e.g., the external Border Gateway Protocol (eBGP)) to communicate with customers (e.g., network 220) and pass routing information to and fro. Conventionally, eBGP requires that an eBGP peering is established with an adjacent and directly connected peer, e.g. a directly connected border router such as large-scale border router 130 of FIG. 1C. The routing protocol session, once established (e.g., an eBGP session) then communicates routing information directly between the transit provider router and the directly connected border router (e.g., large-scale border router 130 of FIG. 1C). Referring again to FIG. 2, instead of using large-scale border routers, one or more small-scale border routers 230 may be directly connected to the transit provider 210 router(s). The small-scale border routers 230 may be commodity routers that support a smaller number of routes (e.g., 16K-32K routes) than do large-scale routers; market volume tends to keep prices of these small-scale routers relatively low (e.g., $15,000 and under) when compared to large-scale routers. In addition, small-scale routers are generally more flexible than large-scale routers, and are generally easier to program and configure for custom applications and custom routing preferences and parameters. Network devices that may be used in the small-scale border router space to implement the small-scale border routers may include, but are not limited to, general purpose servers, for example running Linux technology.

In some embodiments, each small-scale border router 230 is directly connected (e.g., via a fiber optic or cable connection) to one and only one transit provider 210. In some embodiments, the routing protocol peerings (e.g., eBGP peerings) are passed via the small-scale border routers 230 through transparent tunnels (provided via an overlay network, implemented according to an IP tunneling technology, on network 220) to a routing service 260 so that the routing service 260 and the transit provider 210 router(s) appear to be directly adjacent at Layer 2 of the network. In other embodiments, other methods may be used to establish the routing protocol peerings between the transit provider 210 router(s) and the routing service 260. For example, in some embodiments, a Transmission Control Protocol (TCP) pass-through proxy may be implemented on each border router 230. The TCP proxies passes through the routing protocol peerings via connections to the routing service 260 at the application layer of the network. Using these methods to establish routing protocol peerings between transit provider 210 router(s) and routing service 260, to routing protocol (e.g., eBGP) sessions on transit provider(s) 210, it appears as if the routing service 260 is an adjacent peer and a border router; the transit provider(s) 210 may not even be aware that the routing protocol peerings have been "tunneled" or passed through to the routing service 260.

Note that, in some embodiments, a border router 230 may be connected to more than one transit provider router or to more than one transit provider 210, with appropriate logic on the border router 230 to support decision making for the multiple exit paths to the Internet. Also, in some embodiments, more than one border router 230 may be connected to a given transit provider 210.

Routing Service

In at least some embodiments, the routing service 260 may be a software control system that may be implemented, for example, on one or more server systems, which may be standard commodity servers. However, in some embodiments, for example for smaller deployments, the routing service 260 may be implemented and executed in part or in full on other devices on the network than on dedicated server systems. For example, as well as serving as border routers, typical network devices that may be used in the small-scale border router space may also be general purpose servers, for example running Linux technology, on which other processes may be implemented. Thus, in some embodiments, the routing service 260 may be implemented at least in part on the border router(s) 230. In at least some embodiments, only routing information flows through the routing service 260 server(s); actual data traffic (data packets being sent from endpoint devices 250 to Internet destinations and data packets being received by endpoint devices 250 from Internet sources) does not traverse the routing service 260 server(s). Routing service 260 receives all upstream routing data from the Internet transit provider(s) 210, maintains the routing data in an Internet routing table 262, processes the routing data in routing table 262 to select best paths for each Internet prefix, and distributes the processed routing data to a mapping service 270.

In at least some embodiments, routing service 260 serves as the authoritative router for the network 220. As the authoritative router for the network, routing service 260 directs the routing of outgoing packets from endpoint devices 250 on the network 220 onto the Internet via the one or more network border routers 230 according to the routing information in the Internet routing table 262, and directs the routing of incoming packets from the Internet to endpoint devices 250 on the network 220. The network border routers 230 do not store the full Internet routing table, and do not direct the routing of packets to and from the Internet. Instead, to route packets, the network border routers 230 query the routing service 260 for routing information.

However, in some embodiments, the network border routers 230 may maintain a local cache of some routing information (but not the entire Internet routing table), for example routing information for high traffic routes and/or important routes such as a default route for outbound traffic. In these embodiments, when a network border router 230 receives a packet to be routed, the network border router 230 may first check the local cache to see if there is cached routing information for the packet. If there is cached routing information for the packet in the local cache, the network border router 230 may route the packet according to the cached routing information. If there is no cached routing information for the packet in the local cache, the network border router may query routing service 260 (or query mapping service 270, which obtains routing information from routing service 260) to obtain routing information for the packet, and route the packet according to the obtained routing information. The network border router 230 may, but does not necessarily, cache the obtained routing information in the local cache.

Figure 3:
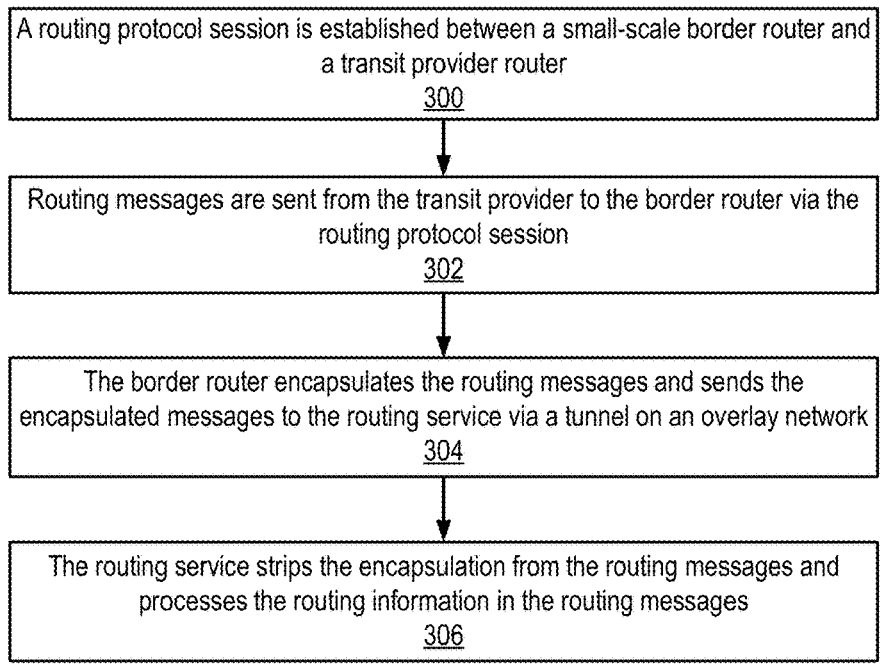
FIG. 3 illustrates establishing a routing protocol peering between a transit provider and a routing service, according to at least some embodiments.

FIG. 3 illustrates establishing a routing protocol peering between a transit provider and a routing service, according to at least some embodiments. As indicated at 300, a routing protocol (e.g., BGP) session is established between a small-scale border router 230 and a transit provider 210 router. BGP (Border Gateway Protocol) is implemented on top of TCP (Transmission Control Protocol); to establish a BGP session, a TCP connection is first established between the border router 230 and the transit provider 210 router. As indicated at 302, routing messages are sent from the transit provider 210 to the border router 230 via the routing protocol session. As indicated at 304, the border router encapsulates the routing messages and sends the encapsulated messages to the routing service 260 via a tunnel on an overlay network implemented according to an IP tunneling technology. As indicated at 306, the routing service 260 strips the encapsulation from the routing messages and processes the routing information in the routing messages. At least some of the routing information is stored to Internet routing table 262.

Mapping Service

The mapping service 270 may be informed, by the routing service 260, of a best exit point (or points) for each Internet prefix of each packet to be routed on the Internet. In addition, the mapping service 270 may be configured to perform some functionality of the IP tunneling technology as described herein. Mapping service 270 may be aware of all network 220 IP prefixes and the IP addresses of routers or other devices serving IP addresses. Thus, various entities on the network 220 may query the mapping service 270 to obtain internal network 220 address information and/or Internet routing exit points. The mapping service 270 may be centralized, for example on a server system, or alternatively may be distributed on two or more server systems or other devices. For example, in some embodiments, the mapping service 270 may be implemented at least in part on the border router(s) 230. In at least some embodiments, actual data traffic does not traverse the mapping service 270 server(s).

The routing service 260 and the mapping service 270 may be implemented on separate devices or systems, or alternatively may both be implemented on the same device(s) or system(s). Furthermore, while FIG. 2 shows the routing service 260 and the mapping service 270 as separate elements, in some embodiments these two services may be merged into one service.

Routing Outbound Packets

Figure 4:
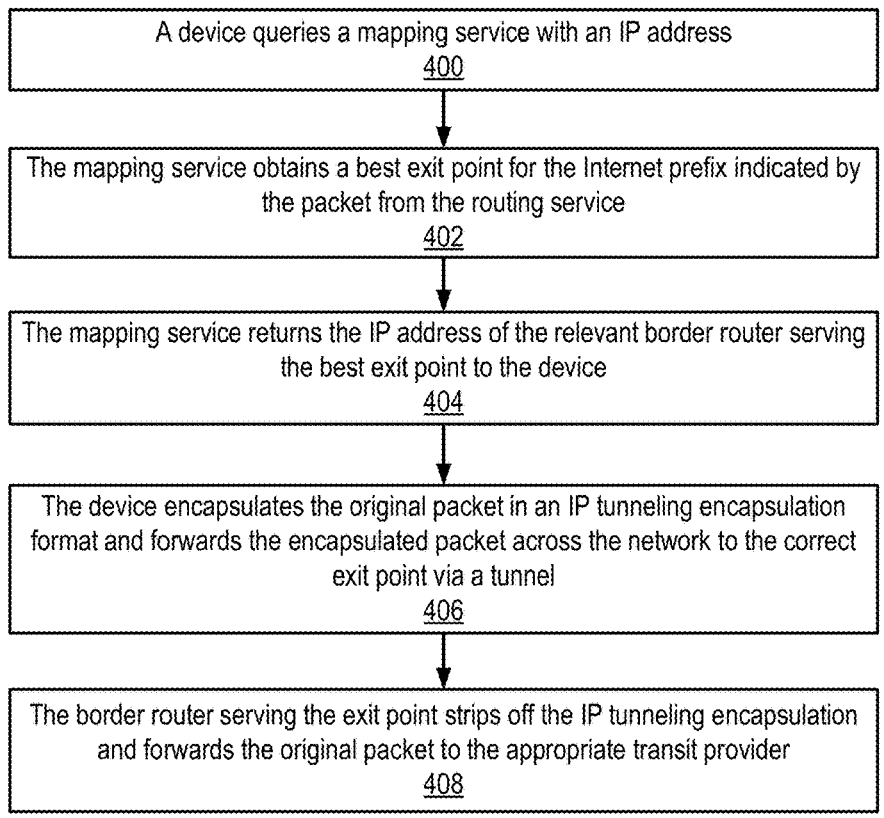
FIG. 4 illustrates a method for routing a packet from a network device onto the Internet, according to some embodiments.

FIG. 4 illustrates a method for routing a packet from a network device onto the Internet, according to some embodiments. In at least some embodiments, when a device 250 has a packet to send to an IP address, the device 250 queries the mapping service 270 to determine where to forward the packet, as indicated at 400. If this packet is destined for the Internet, the mapping service 270 obtains a best exit point for the Internet prefix indicated by the packet from the routing service 260, as indicated at 402. The mapping service 270 returns the IP address of the relevant border router 230 serving the best exit point to the device 250, as indicated at 404. The device 250 encapsulates the original packet in an IP tunneling encapsulation format and forwards the encapsulated packet across the network to the correct exit point (the relevant border router 230) via a tunnel 282, as indicated at 406. The border router 230 serving the exit point strips off the IP tunneling encapsulation to reveal the original packet and forwards the packet to the appropriate transit provider 210, as indicated at 408. The transit provider 210 routes the packet as normal to the indicated Internet IP address.

While the above describes the device 250 as querying the mapping service 270 to determine where to forward a packet when the device 250 has a packet to send to an IP address, it is not generally feasible to query the mapping service for every packet or even every flow. Thus, in at least some embodiments, devices such as device 250 may maintain a local cache of routing information. In some embodiments, the local cache may be pre-populated for some routes, for example for high traffic routes and/or important routes. The device 250 may first check the local cache to determine if there is cached routing information for the IP address. If the routing information is not in the local cache, then the device 250 may query the mapping service.

In some embodiments, instead of the device 250 querying the mapping service and encapsulating the packet, a router or other device 240 may receive the packet from device 250 and similarly query the mapping service, perform the encapsulation, and forward the packet to the relevant border router 230.

Routing Inbound Packets

Figure 5:
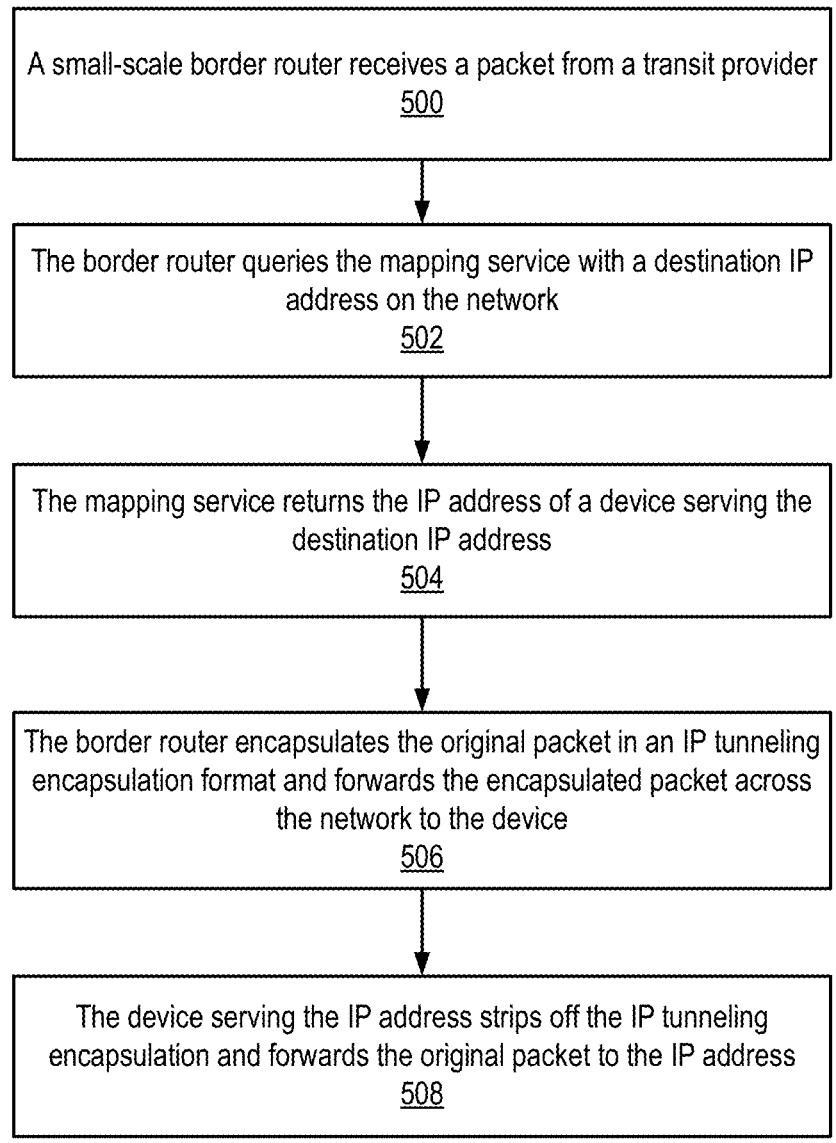
FIG. 5 illustrates a method for routing a packet received from the Internet to a target device on a network, according to some embodiments.

FIG. 5 illustrates a method for routing a packet, received from the Internet, to a target device on a network, according to some embodiments. As indicated at 500, a small-scale border router 230 receives a packet from a transit provider 210. As indicated at 502, the border router 230 queries the mapping service 270 with a destination IP address on the network. Mapping service 270 is aware of all network 220 IP prefixes and the IP addresses of the router or other device serving the destination IP address. As indicated at 504, the mapping service 270 returns the IP address of the router or other device serving the destination IP address to the border router 230. As indicated at 506, the border router 230 encapsulates the original packet in an IP tunneling encapsulation format and forwards the encapsulated packet across the network via a tunnel 282 to the router or other device serving the destination IP address. As indicated at 508, the router or other device serving the IP address strips off the IP tunneling encapsulation and forwards the original packet to the destination IP address.

While the above describes the border router 230 as querying the mapping service 270 to determine where to forward a packet when the border router 230 has a packet to send to a destination IP address on the network, it is not generally feasible to query the mapping service for every packet or even every flow. Thus, in at least some embodiments, border router 230 may maintain a local cache of routing information. In some embodiments, the local cache on a border router 230 may be pre-populated for some routes, for example for high traffic routes and/or important routes. The border router 230 may first check the local cache to determine if there is cached routing information for an IP address. If the routing information is not in the local cache, then the border router 230 may query the mapping service.

IP Tunneling Technology

As mentioned above, at least some embodiments may employ an Internet Protocol (IP) tunneling technology to provide an overlay network via which routing protocol peerings between the transit providers 210 and the routing service 260 are established, and via which encapsulated packets may be passed through an IP tunneling substrate 280 using tunnels 282. The IP tunneling technology may provide a mapping and encapsulating system for creating an overlay network on a network (e.g., network 220 of FIG. 2) and may provide a separate namespace for the overlay layer and the substrate 280 layer. Packets in the overlay layer may be checked against a mapping directory (e.g., provided by mapping service 270) to determine what their tunnel substrate target should be. The IP tunneling technology provides a virtual network topology; the interfaces that are presented to "customers" are attached to the overlay network so that when a customer provides an IP address that they want to send packets to, the IP address is run in virtual space by communicating with a mapping service (e.g., mapping service 270) that knows where the IP overlay addresses are.

In at least some embodiments, the IP tunneling technology may map IP overlay addresses to substrate IP addresses, encapsulate the packets in a tunnel between the two namespaces, and deliver the packet to the correct endpoint via the tunnel, where the encapsulation is stripped from the packet. In some embodiments, the packet may be encapsulated in an IP tunneling packet format before sending, and the IP tunneling packet may be stripped after receiving. In other embodiments, instead of encapsulating packets in IP tunneling packets, an IP tunneling address may be embedded in a substrate address of a packet before sending, and stripped from the packet address upon receiving. As an example, the overlay network may be implemented using 32-bit IPv4 (Internet Protocol version 4) addresses, and the IPv4 addresses may be embedded as part of 128-bit IPv6 (Internet Protocol version 6) addresses used on the substrate network.

Example embodiments of an IP tunneling technology that may be used in at least some embodiments are described in U.S. patent application Ser. No. 12/060,074, titled "CONFIGURING COMMUNICATIONS BETWEEN COMPUTING NODES," filed Mar. 31, 2008, whose inventor is Daniel T. Cohn, and which is hereby incorporated by reference in its entirety.

Networks with Hardware Virtualization

Some networks in which embodiments may be implemented may include hardware virtualization technology that enables multiple operating systems to run concurrently on a host computer, i.e. as virtual machines (VMs) on the host. The VMs may, for example, be rented or leased to customers of the network provider. A hypervisor, or virtual machine monitor (VMM), on a host presents the VMs on the host with a virtual platform and monitors the execution of the VMs. Each VM may be provided with one or more IP addresses; the VMM on a host may be aware of the IP addresses of the VMs on the host. As previously mentioned, mapping service 270 may be aware of all network 220 IP prefixes and the IP addresses of routers or other devices serving IP addresses. This includes the IP addresses of the VMMs serving multiple VMs. A network may be configured to use the mapping service technology and IP tunneling technology described herein to, for example, route data packets between VMs on different hosts within the network. In addition, a network may be configured to use the mapping service technology, IP tunneling technology, and routing service technology described herein to route packets from the VMs to Internet destinations, and from Internet sources to the VMs.

Figure 6:
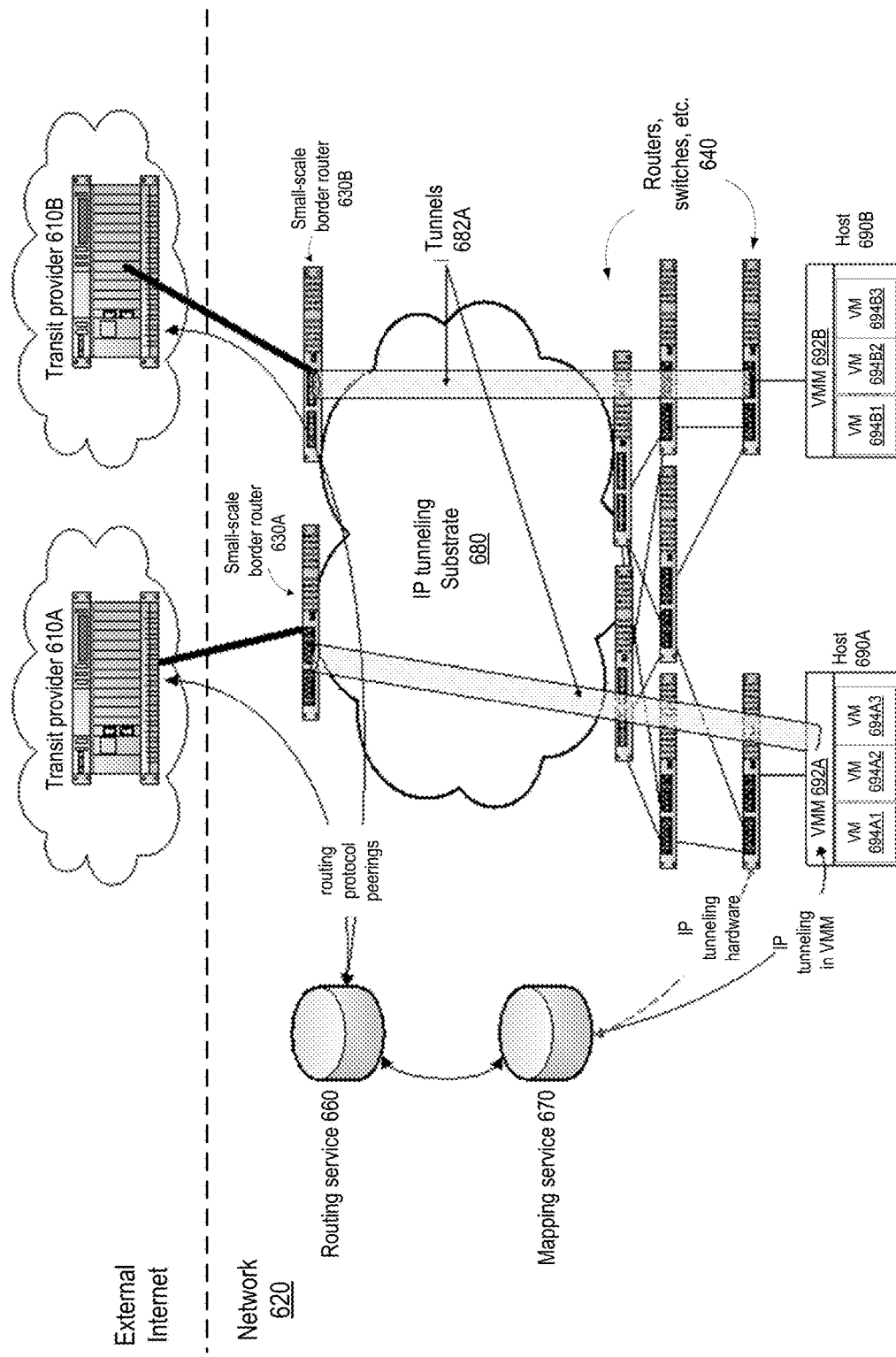
FIG. 6 illustrates an example network that implements hardware virtualization technology and that provides full Internet access using small-scale, commodity routers, according to at least some embodiments.

FIG. 6 illustrates an example network that implements hardware virtualization technology and that provides full Internet access using small-scale, commodity routers, according to at least some embodiments. The network 620 may implement IP tunneling technology, mapping service technology, and routing service technology as described herein to route packets from the VMs 694 on hosts 690 to Internet destinations, and from Internet sources to the VMs 694.

Routing Outbound Packets from a VM

In at least some embodiments, when a VM 694 sends a packet on the network 620, the VMM 692 on the host 690 intercepts the packet. The VMM 692 queries the mapping service 670 to determine where to forward the packet. If the packet is destined for the Internet, the mapping service 670 returns the IP address of the relevant border router 630 serving the best exit point. The VMM 692 encapsulates the original packet in the IP tunneling encapsulation format and forwards the packet across the network 620 to the correct exit point. The border router 630 serving the exit point strips off the IP tunneling encapsulation to reveal the original packet, and forwards the packet to the transit provider 610, which routes it as normal to the Internet IP address.

Figure 7:
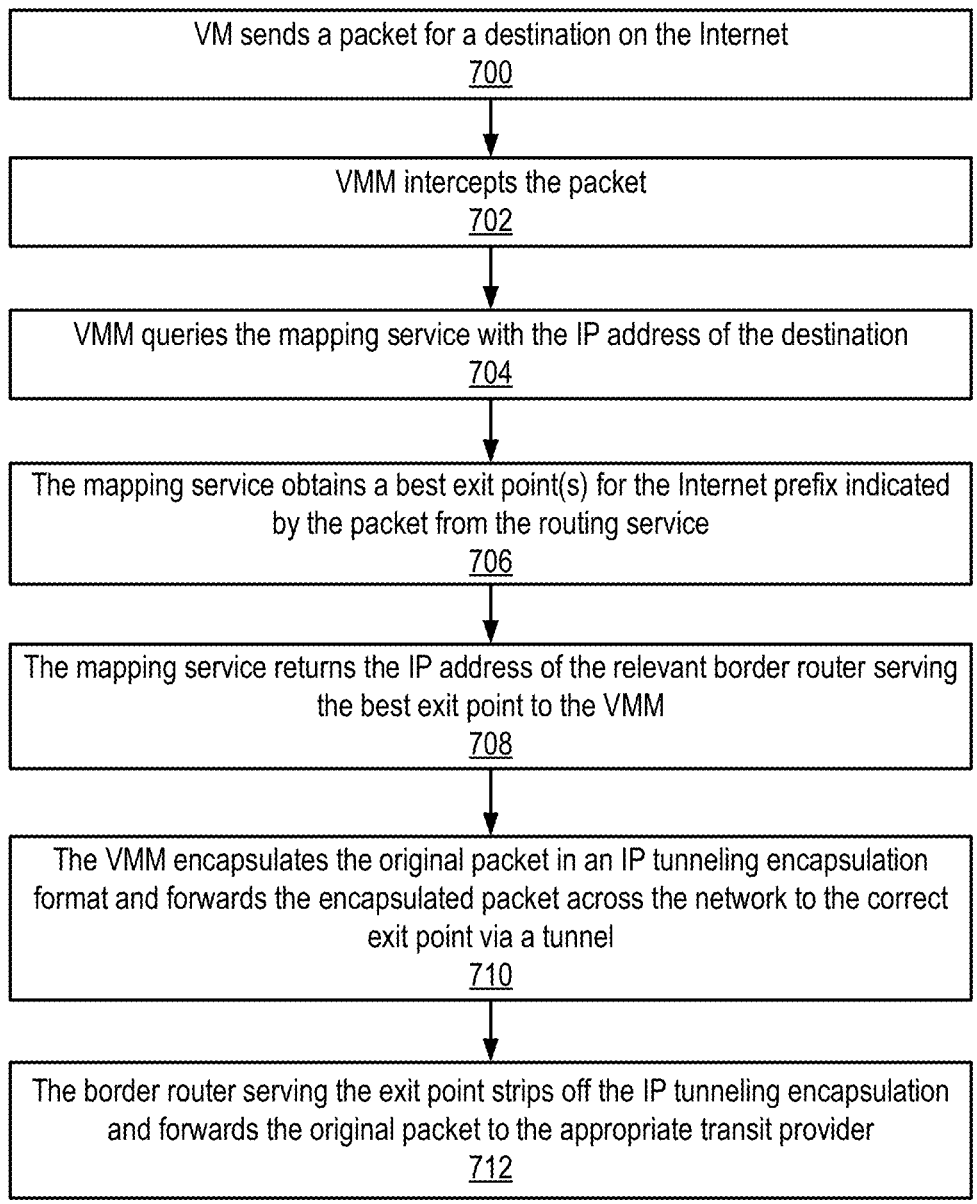
FIG. 7 illustrates a method for routing a packet from a virtual machine (VM) on a network implementing hardware virtualization technology onto the Internet, according to some embodiments.

FIG. 7 illustrates a method for routing a packet from a VM on a network implementing hardware virtualization technology onto the Internet, according to some embodiments. Each VM 694 may have a public internet IP address. It is to be noted that there may be some VMs that do not have public IP addresses. Additionally, there may be other classes of devices that have public IP addresses, such as virtual firewalls and load balancers. As indicated at 700, a VM 694 on a host 690 sends a packet to a public destination internet IP address. As indicated at 702, the packet is intercepted by the VMM 692 on the host 690. As indicated at 704, the VMM 692 queries the mapping service 670 with the IP address of the destination. As indicated at 706, the mapping service 670 is informed of all internet prefixes and the IP address(es) of the best exit point(s) for the packet by the routing service 660. As indicated at 708, the mapping service 670 returns the IP address of the best exit point(s) to the VMM 692. As indicated at 710, the VMM 692 encapsulates the original packet in an IP tunneling encapsulation format and forwards the encapsulated packet across the network 620 to the correct exit point via a tunnel 682. For example, the VMM 692 may forward the packet to the next-hop router. The next-hop router sees the packet as having the source address of the VMM 692 and a destination address of the border router 630 serving the selected exit point. The network 620 transports the packet to the border router 630 serving the selected exit point via the tunnel 682. As indicated at 712, the border router 630 serving the selected exit point strips off the outer IP tunneling encapsulation and reveals the original packet with the public source and destination IP addresses, and forwards the packet to the transit provider 610. The transit provider 610 sees an ordinary internet IP packet and forwards the packet accordingly.

In some embodiments, instead of the VMM 692 querying the mapping service and encapsulating the packet, a router or other device 640 may receive the packet from VMM 692 and similarly query the mapping service, perform the encapsulation, and forward the packet to the relevant border router 630.

While the above describes the VMM 692 as querying the mapping service 670 to determine where to forward a packet when the VMM 692 intercepts a packet to send to an IP address, it is not generally feasible to query the mapping service for every packet or even every flow. Thus, in at least some embodiments, a VMM 692 may maintain a local cache of routing information. In some embodiments, the local cache may be pre-populated for some routes, for example for high traffic routes and/or important routes. The VMM 692 may first check the local cache to determine if there is cached routing information for the IP address. If the routing information is not in the local cache, then the VMM 692 may query the mapping service.

Routing Inbound Packets to a VM

Figure 8:
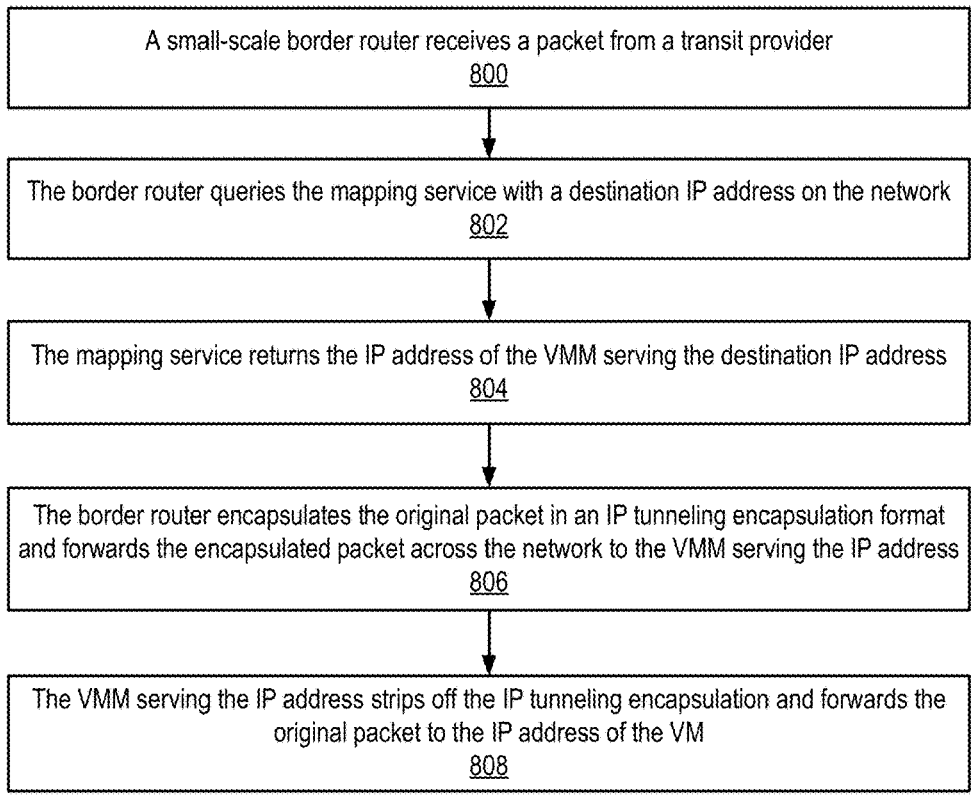
FIG. 8 illustrates a method for routing a packet received from the Internet to a target VM on a network implementing hardware virtualization technology, according to some embodiments.

FIG. 8 illustrates a method for routing a packet received from the Internet to a target VM on a network implementing hardware virtualization technology, according to some embodiments. As indicated at 800, a small-scale border router 630 receives a packet from a transit provider 610. As indicated at 802, the border router 630 queries the mapping service 670 with a destination IP address on the network. Mapping service 670 is aware of all network 620 IP prefixes and the IP addresses of the router or other device serving the destination IP address. As indicated at 804, the mapping service 670 returns the IP address of the VMM 692 serving the destination IP address to the border router 630. As indicated at 806, the border router 630 (or, in some embodiments, some other device, such as a top-of-rack router) encapsulates the original packet in an IP tunneling encapsulation format and forwards the encapsulated packet across the network via a tunnel 682 to the VMM 692 serving the destination IP address. As indicated at 808, the VMM 692 serving the IP address (or, alternatively, a router serving the VM 694) strips off the IP tunneling encapsulation and forwards the original packet to the VM 694 with the destination IP address.

While the above describes the border router 630 as querying the mapping service 670 to determine where to forward a packet when the border router 630 has a packet to send to a destination IP address on the network, it is not generally feasible to query the mapping service for every packet or even every flow. Thus, in at least some embodiments, border router 630 may maintain a local cache of routing information. In some embodiments, the local cache on a border router 630 may be pre-populated for some routes, for example for high traffic routes and/or important routes. The border router 630 may first check the local cache to determine if there is cached routing information for an IP address. If the routing information is not in the local cache, then the border router 630 may query the mapping service.

Routing Service Optimizations

Some embodiments of a routing service and/or mapping service as described herein may use various business and/or technical data sources and policies in making routing decisions to bias traffic distribution beyond what is normally possible in conventional systems using standard routing protocol (e.g., BGP) attributes and routing policies. For example, one or more of usage data for individual IP address prefixes, Simple Network Management Protocol (SNMP) data from individual links in the network, Internet "weather" metrics, carrier preferences, and cost optimization metrics may be used in various embodiments, along with appropriate policies, to make routing decisions.

For example, conventional routers are not aware of business logic. In some embodiments, when evaluating routes in the Internet routing table, the routing service may consider business logic in the decision-making process. As an example, transit providers are generally commercial enterprises that charge fees for routing packets. The routing service may thus consider cost when selecting a route; a longer route via first transit provider may be selected over a shorter route via a second transit provider if the cost of the route via the first provider is less.

As another example, some embodiments may monitor how much traffic is coming from and/or going to particular destinations on the network. For example, a network that provides VMs to customers via hardware virtualization technology may monitor traffic to and from individual VMs. Routing decisions for the VMs may be biased by the routing service based on volume. Another example use case directed to business logic is to manage total traffic to transit providers. This traffic may be across multiple links in multiple locations. Transit billing arrangements may include minimum commitments that are to be met and that may be measured monthly or annually, and traffic may need to be rebalanced to meet these business goals.

As yet another example, some embodiments may monitor Internet "weather" metrics to determine performance of various routes. If a route (or routes) with poor performance is detected, the routing service may direct traffic onto different routes. Some embodiments may send test packets on various routes, or use some other type of active probing, to measure latency or other metrics on various routes, and use the statistics resulting from this testing to influence routing decisions.

In some embodiments, Simple Network Management Protocol (SNMP) data from the network, or some other network protocol, may be used to query devices in the internal network to monitor, for example, network congestion in portions of the internal network (e.g., in various data centers of the network). If a data center is detected that is having problems, e.g. traffic congestion, the routing service and mapping service may route some network traffic to a different data center on the network before the packets are sent to the Internet.

BGP Peering Alternatives

The above describes a method for using IP tunneling technology to establish an eBGP peer session between a transit provider and the routing service. Embodiments do not change the standard Internet routing protocol (e.g., BGP). Normal BGP sessions with transit providers are established; however, in embodiments, the sessions terminate at the routing service rather than directly on the border router(s). BGP supports a standard option for eBGP multi-hop links. Some transit providers may support this option. Thus, in some embodiments, the border router(s) may be configured to implement this multi-hop option to carry the eBGP session through to the routing service. For connections to transit services that do not support this option, an IP tunneling technique as described herein may be used to carry the eBGP session to the routing service.

In some embodiments, for at least some border routers, a Transmission Control Protocol (TCP) pass-through proxy may be configured on the border router to carry the eBGP session to the routing service, rather than using the eBGP multi-hop option or an IP tunneling technique. The TCP proxy on a network border router establishes a connection to the routing service, and forwards routing protocol (e.g., BGP) messages received from a respective transit provider network to the routing service via the connection. The TCP proxy is effectively a small daemon running on the network border router. The daemon listens on the TCP port(s) that belong to the routing protocol (e.g., BGP). The daemon establishes another connection to the routing service. This connection acts as a pass-through tunnel to the routing service for the routing protocol messages received from the respective transit provider network. The daemon encapsulates the packets at the application layer of the network rather than at the network layer as is done in the IP tunneling technique. A TCP pass through proxy may allow, for example, the replication of the routing service to provide redundancy. The routing daemon can open two (or more) backend connection to two (or more) instances of the routing service and duplicate the routing protocol messages to the two (or more) instances.

Figure 9:
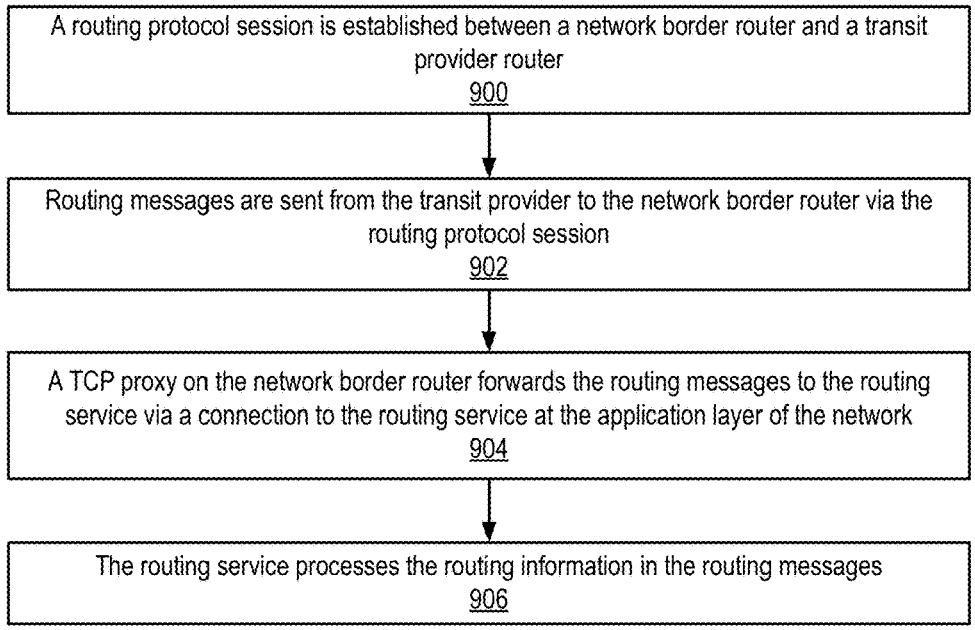
FIG. 9 illustrates establishing a routing protocol peering between a transit provider and a routing service using a TCP proxy, according to at least some embodiments.

FIG. 9 illustrates establishing a routing protocol peering between a transit provider and a routing service using a TCP proxy, according to at least some embodiments. As indicated at 900, a routing protocol (e.g., BGP) session is established between a small-scale border router on the network and a transit provider router. BGP (Border Gateway Protocol) is implemented on top of TCP (Transmission Control Protocol); to establish a BGP session, a TCP connection is first established between the network border router and the transit provider router. As indicated at 902, routing messages are sent from the transit provider to the network border router via the routing protocol session. As indicated at 904, a TCP proxy on the border router forwards the routing messages to the routing service via a connection to the routing service at the application layer of the network. As indicated at 906, the routing service processes the routing information in the routing messages. At least some of the routing information is stored to an Internet routing table maintained by the routing service.

Redundancy

In some embodiments, redundancy may be provided for some components of a network as illustrated in FIGS. 3 and 6. For the routing service, a number of active/passive and active/active backup mechanisms are possible to provide redundancy. In some embodiments, upstream updates may be replicated. In some embodiments, downstream sessions may be multiple if necessary or desired. In some embodiments, the routing service itself may be replicated to provide redundancy. In these embodiments, for example, a TCP proxy may be implemented on each network border router that establishes pass-through connections from a respective network service provider to each instance of the routing service.

In at least some embodiments, the mapping service may be implemented as a distributed cache of mappings. If the central mapping service fails, the cache persists and traffic continues to flow, although updates cease.

Some embodiments may utilize a multi-path or Equal-Cost Multi-Path (ECMP) strategy to establish more than one best path or route to a destination address in parallel, thus providing route redundancy. ECMP is a routing strategy where packet forwarding to a destination may be performed over multiple best paths. For example, in some embodiments, the mapping service and routing service may provide routing information indicating multiple best paths to a destination address, and the network may route the packet(s) to the destination over at least two of the indicated paths.

Illustrative System

Figure 10:
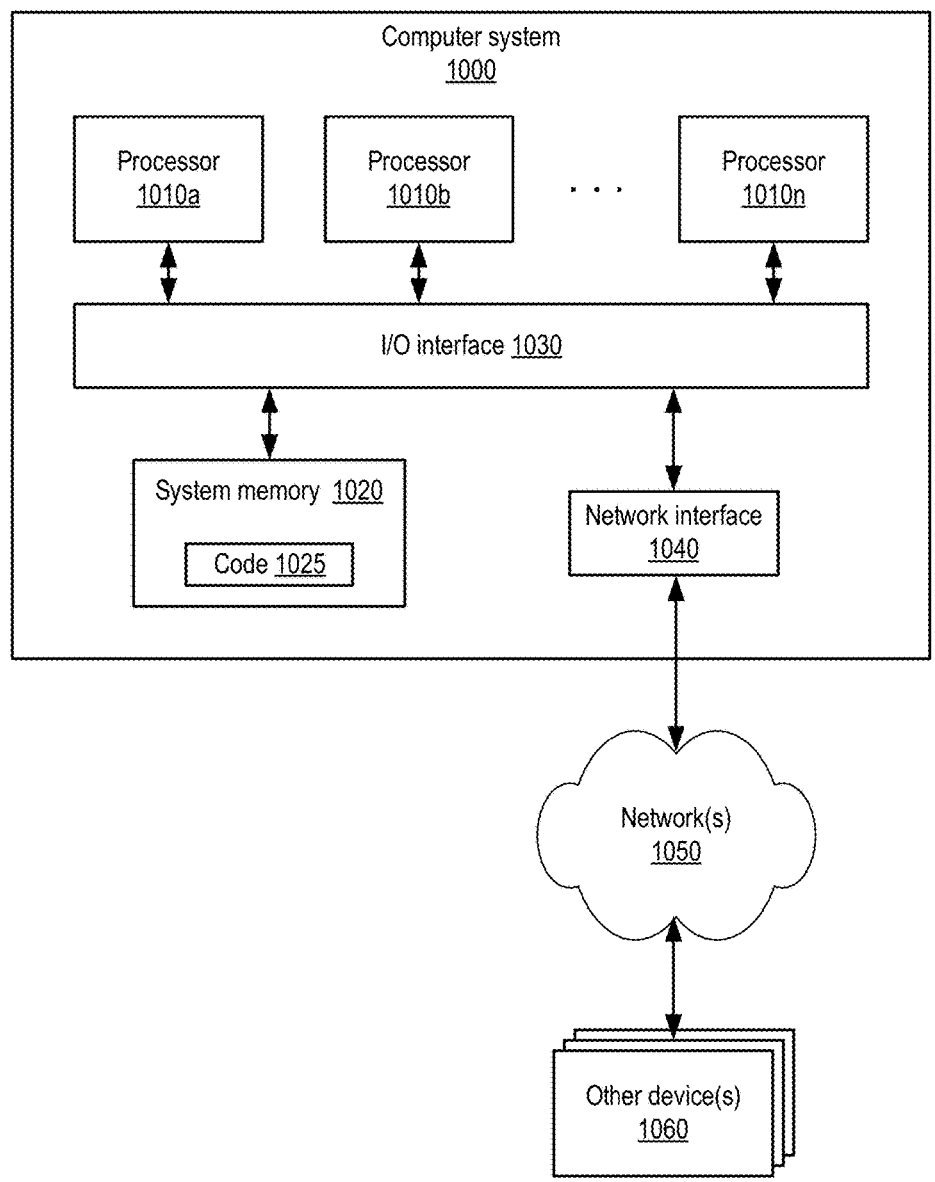
FIG. 10 is a block diagram illustrating an example computer system that may be used in some embodiments.

In at least some embodiments, a server that implements a portion or all of one or more of the technologies, including but not limited to the routing service technology, the mapping service technology, and the small-scale border router technology as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods and techniques described above for a mapping service, a routing service, small-scale border routers, IP tunneling, and/or a VMM hosting multiple VMs on a host machine, are shown stored within system memory 1020 as code 1025.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIGS. 3 and 6, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 3 through 9 for implementing embodiments of methods and apparatus for achieving Internet-scale routing using small-scale routers and an overlay network. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 1000 via I/O interface 1030. A computer-accessible medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   network border routers of a first network; and
   a computing device configured to implement a routing service for the first network, wherein to implement the routing service, the computing device is configured to:
     establish a tunnel or pass-through proxy connection between the computing device implementing the routing service and a given one of the network border routers of the first network;
     establish a routing protocol session with a border router of an external network external to the first network, wherein the routing protocol session is established through the tunnel or the pass-through proxy connection, wherein the routing service connected to the given network border router of the first network via the tunnel or the pass-through proxy connection appears to the border router of the external network as a peer border router;
     receive routing information from the border router of the external network via the routing protocol session; and
     store the received routing information remote from the given network border router of the first network, wherein a full set of routes included in the received routing information from the external network border router is not stored in the given network border router of the first network.

2. The system of claim 1, wherein the computing device implementing the routing service and the given network border router are connected via the tunnel, wherein the tunnel is an Internet Protocol (IP) tunnel.

3. The system of claim 1, wherein the computing device implementing the routing service and the given network border router are connected via the pass-through proxy connection, wherein the pass-through proxy connection is a transmission control protocol (TCP) connection and wherein the given network border router acts as a TCP proxy for the routing service.

4. The system of claim 1, wherein the routing protocol session is a Border Gateway Protocol (BGP) session.

5. The system of claim 1, wherein the external network is a transit provider network.

6. The system of claim 1, wherein the system further comprises:

a computing device implementing a mapping service for the first network, wherein the mapping service stores addresses for devices within the first network;
   wherein, for an incoming packet from the external network, the given network border router is configured to issue a query to the mapping service to determine an address of a device within the first network to which the packet is directed,
   wherein, in response to the query, the computing device implementing the mapping service is configured to provide the given network border router the address of the device within the first network to which the packet is directed, and
   wherein the given network border router is further configured to encapsulate the received packet and forward the received packet via a tunnel to the device within the first network at the provided address.

7. The system of claim 6, wherein the mapping service further stores addresses of the network border routers of the first network and corresponding IP address prefixes for external addresses serviced by respective ones of the network border routers of the first network,
   wherein, for an outgoing packet from a device within the first network, the mapping service is configured to determine an address of a particular one of the network border routers servicing an IP prefix included in an address to which the outgoing packet is being sent, wherein the outgoing packet is forwarded to the particular one of the network border routers servicing the IP prefix.

8. The system of claim 7, wherein the mapping service is further configured to:
   receive updated IP address information for the external addresses serviced by the respective ones of the network border routers from the routing service.

9. A method comprising:
   establishing, by a computing device implementing a routing service for a network, a connection within the network with a border router of the network;
   establishing, via the connection with the border router, a routing protocol session between the routing service and a border router of an external network external to the network, wherein the computing device implementing the routing service appears to the external border router as a peer border router;
   receiving network routing information from the border router of the external network via the routing protocol session; and
   storing the received routing information at a location remote from the border router of the network through which the routing protocol session was established.

10. The method of claim 9, wherein the routing service connected through the border router of the provider network is presented to the border router of the external network as a peer border router.

11. The method of claim 9, wherein the connection established by the routing service with the border router of the network is an IP tunnel between the computing device implementing the routing service and the border router of the network.

12. The method of claim 9, wherein the connection established by the routing service with the border router of the network is a transmission control protocol (TCP) connection, wherein the network border router acts as a TCP proxy for the computing device implementing the routing service.

13. The method of claim 9, further comprising:
receiving, by the routing service, a query for a route for an outgoing packet from the border router of the network or from another border router of the network;
determining, by the routing service, a route for the outgoing packet based on the stored routing information; and
providing the determined route to the border router or the other border router for use in forwarding the packet to a device external to the network.

14. The method of claim 13, wherein said determining the route for the outgoing packet by the routing service comprises determining the route based on:
internet weather information available to the routing service; or
business logic information available to the routing service.

15. A method comprising:
receiving, by a border router of a network, a request from a routing service of the network to establish a connection with the network border router;
establishing the connection with the routing service; and
passing routing information between the routing service and a border router of an external network external to the network via the connection with the routing service, wherein the routing service connected to the border router of the network via the established connection appears to the external border router as a peer border router.

16. The method of claim 15, wherein said establishing the connection with the routing service comprises establishing an IP tunnel between the border router of the network and a computing device implementing the routing service,
wherein said passing routing information between the routing service and the border router of the external network comprises encapsulating and decapsulating routing information passed between the routing service and the border router of the external network.

17. The method of claim 15, wherein said establishing the connection with the routing service comprises establishing a transmission protocol (TCP) session between the between the border router of the network and a computing device implementing the routing service, wherein the border router of the network functions as a TCP proxy pass-through between the computing device implementing the routing service and the border router of the external network.

18. The method of claim 15, further comprising:
receiving, by the border router of the network, an outgoing packet from a device within the network, wherein the packet is directed to an address external to the network;
querying, by the border router of the network, the routing service for a route for the address external to the network;
receiving, by the border router of the network, the route from the routing service; and
forwarding, by the border router of the network, the outgoing packet according to the received route.

19. The method of claim 18, further comprising:
determining, by the border router of the network, if the route is a high traffic route; and
in response to determining the route is a high traffic route, saving the route in a cache of the border router of the network.

20. The method of claim 15, further comprising:
receiving, by the border router of the network, an incoming packet from the external network;
querying, by the border router of the network, a mapping service implemented on a separate computing device for an address of a device within the network to which the incoming packet is directed; and
forwarding the packet to the address of the device within the network to which the incoming packet is directed.

\* \* \* \* \*